United States Patent
Costa et al.

(10) Patent No.: US 9,702,375 B2
(45) Date of Patent: Jul. 11, 2017

(54) LINER ATTACHING SCHEME

(71) Applicant: United Technologies Corporation, Hartford, CT (US)

(72) Inventors: Mark W. Costa, Storrs, CT (US); Thomas J. Robertson, Jr., Glastonbury, CT (US); David A. Welch, Quaker Hill, CT (US)

(73) Assignee: United Technologies Corporation, Hartford, CT (US)

( * ) Notice: Subject to any disclaimer, the term of this patent is extended or adjusted under 35 U.S.C. 154(b) by 464 days.

(21) Appl. No.: 14/322,527

(22) Filed: Jul. 2, 2014

(65) Prior Publication Data

US 2015/0023780 A1   Jan. 22, 2015

Related U.S. Application Data

(60) Provisional application No. 61/846,962, filed on Jul. 16, 2013.

(51) Int. Cl.
| | |
|---|---|
| *F04D 29/52* | (2006.01) |
| *F01D 25/24* | (2006.01) |
| *F02C 7/045* | (2006.01) |
| *F01D 11/18* | (2006.01) |
| *F04D 29/64* | (2006.01) |

(52) U.S. Cl.
CPC ............ *F04D 29/526* (2013.01); *F01D 11/18* (2013.01); *F01D 25/246* (2013.01); *F02C 7/045* (2013.01); *F04D 29/644* (2013.01); *F05D 2230/642* (2013.01); *Y02T 50/672* (2013.01); *Y10T 29/49229* (2015.01)

(58) Field of Classification Search
CPC .... F02C 7/04; F02C 7/05; F02C 7/045; F01D 25/246; F01D 11/18; F04D 29/526; F04D 29/644; Y10T 29/49229; F05D 2230/642; Y02T 50/672
See application file for complete search history.

(56) References Cited

U.S. PATENT DOCUMENTS

| | | | | |
|---|---|---|---|---|
| 3,683,873 | A | * | 8/1972 | Tarter .................. B23P 6/00 123/169 R |
| 6,382,905 | B1 | | 5/2002 | Czachor et al. |
| 2008/0135329 | A1 | * | 6/2008 | Strunk .................. F02C 7/045 181/214 |
| 2009/0324390 | A1 | * | 12/2009 | Harper .................. B64D 33/02 415/119 |
| 2010/0084507 | A1 | | 4/2010 | Vauchel et al. |
| 2011/0014044 | A1 | | 1/2011 | Vauchel et al. |
| 2011/0192134 | A1 | | 8/2011 | Vauchel et al. |
| 2012/0148392 | A1 | * | 6/2012 | Lussier ................ F01D 21/045 415/200 |
| 2012/0207583 | A1 | | 8/2012 | Voleti et al. |

FOREIGN PATENT DOCUMENTS

GB   2 274 490 A   7/1994

* cited by examiner

*Primary Examiner* — Nathaniel Wiehe
*Assistant Examiner* — Zubair Eltaf
(74) *Attorney, Agent, or Firm* — Kinney & Lange, P. A.

(57) ABSTRACT

A gas turbine engine includes a liner disposed around a flowpath. The liner has a forward end, a radially outer surface, and a radially inner surface. A hole extends axially into the forward end of the liner between the radially outer surface and the radially inner surface, and an engagement member is partially disposed in the hole and extends axially forward from the forward end of the liner.

18 Claims, 6 Drawing Sheets

LINER ATTACHING SCHEME

CROSS-REFERENCE TO RELATED APPLICATION

This application claims priority to U.S. Provisional Application No. 61/846,962, filed on Jul. 16, 2013, and entitled "Liner Attaching Scheme," the disclosure of which is incorporated by reference in its entirety.

BACKGROUND

The present disclosure relates generally to cases in gas turbine engines and more specifically to fan case liners and methods for attaching such liners.

Aircraft turbine and turbofan engines include a set of fan blades that rotate within a fan case immediately downstream from an inlet cowl. The fan case is constructed to cover and protect the fan blades and to contain the fan blades in the event that a foreign object, such as a bird, is ingested through the inlet cowl. A liner is often installed on the inner surface of the fan case to acoustically reduce the noise emitted by the engine and to improve the efficiency of the engine by reducing clearance gaps between the fan blades and the fan casing.

In the prior art, one method of installing the liner onto the inner surface of the fan case is to bond the liner to the inner surface by an adhesive or epoxy. Bonding the liner to the inner surface of the fan case is disadvantageous because it is difficult to subsequently remove the bonded liner from the inner surface of the fan case for repair or replacement. In addition, the bonded liner is subject to movement caused by the thermal contraction and expansion of the fan casing during engine operation. This is especially problematic when the fan casing is made of a different material with a different coefficient of thermal expansion than the fan blades. During cold engine operations at high altitudes, a fan case with a different coefficient of thermal expansion than the fan blades could contract less than the fan blades, causing gaps to form between the fan blades and the bonded liner and thereby allow air to leak around the fan blade tips and decrease the efficiency of the engine.

In the prior art, fan case liners have also been connected to the inner surface of the fan case by bolts that extended radially through the fan case and the liner. While the bolted liner is easier to remove from the fan case than the bonded liner, the bolted liner is also subject to the thermal contraction and expansion of the fan casing during engine operation, similar to the bonded liner as described above. In addition, the bolted liner requires additional machining to ensure that the heads of the bolts do not extend radially inward from the bolted liner and disrupt the flowpath of the gases moving across the fan blades. Additional machining of the bolted liner increases the manufacturing complexity and cost of the bolted liner.

SUMMARY

According to the present invention, an assembly for a gas turbine engine includes a liner disposed around a flowpath. The liner has a forward end, a radially outer surface, and a radially inner surface. A hole extends axially into the forward end of the liner between the radially outer surface and the radially inner surface, and an engagement member is at least partially disposed in the hole and extends axially forward from the forward end of the liner.

In another embodiment of the present invention, a method of assembling a fan liner in a gas turbine engine includes positioning the fan liner at least partially radially inward from a fan case and around a flowpath. The fan liner includes a forward end, a radially outer surface, a radially inner surface, and a hole disposed in the forward end between the radially outer surface and the radially inner surface. An engagement member is inserted into the hole such that a portion of the engagement member extends forward from the hole. A fan inlet cowl is positioned on the engagement member and forward from the fan liner such that the engagement member extends into a first flange of the fan inlet cowl. The first flange is disposed forward from the forward end of the fan liner.

In another embodiment of the present invention, a gas turbine engine includes a fan inlet cowl and a fan case disposed aftward from the fan inlet cowl. A fan liner is disposed at least partially radially inward from the fan case. The fan liner includes a forward end disposed aftward from the fan inlet cowl, a radially outer surface facing the fan case, and a radially inner surface facing a gas flowpath bounded by the fan case and fan inlet cowl. At least one engagement member extends aftward from the fan inlet cowl and into the forward end of the fan liner.

Figure 1:
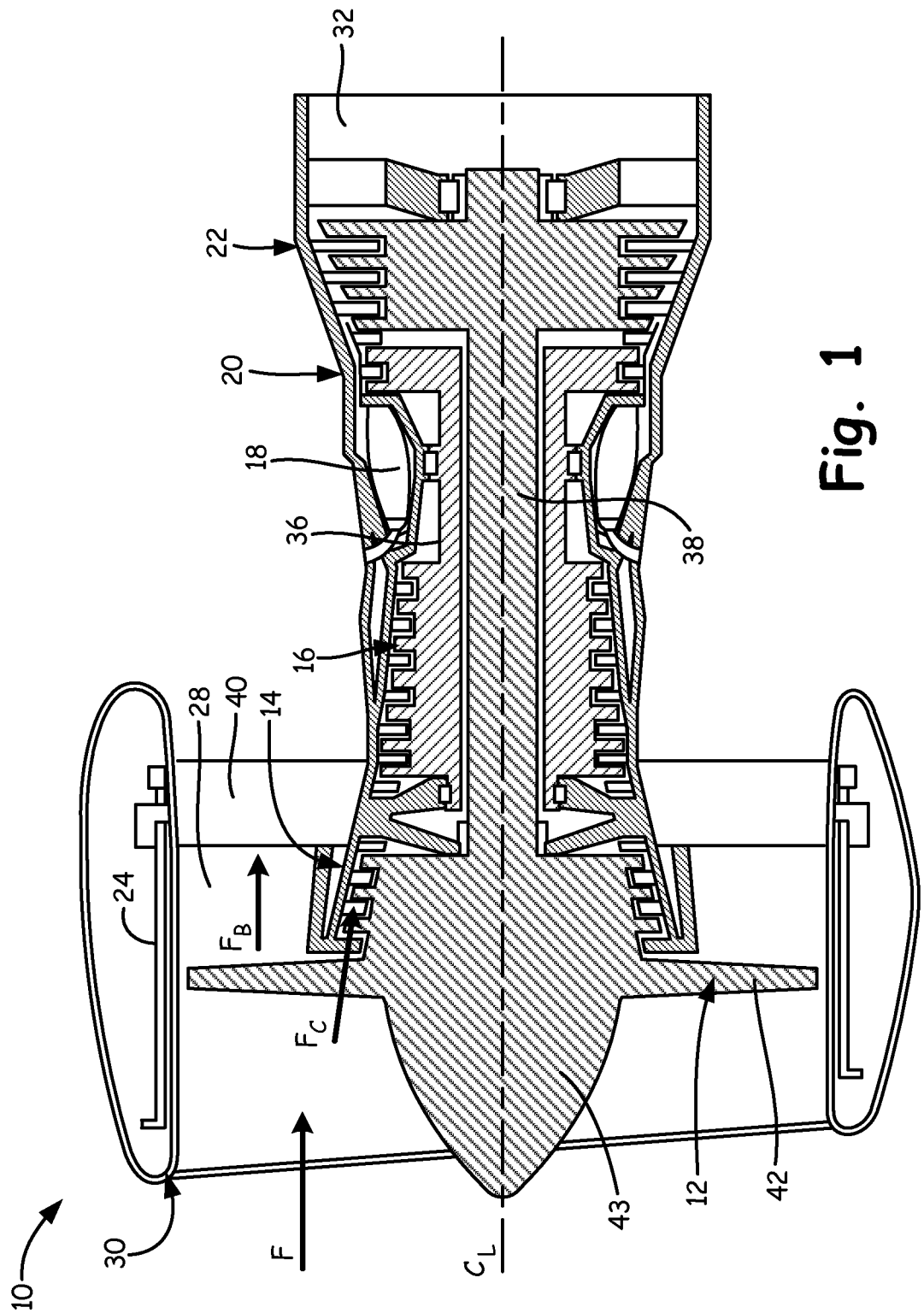
FIG. 1 is a cross-sectional side view of a gas turbine engine.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In general, the present invention provides a fan liner radially within a fan case and downstream from an inlet cowl of a gas turbine engine. Engagement members, such as pins, extend axially between the inlet cowl and the fan liner, and can help position the fan liner relative the inlet cowl and fan case and constrain rotational movement of the fan liner relative the inlet cowl and the fan case. At least one block can extend axially inward from the fan case and abut one or more brackets disposed on the outer casing of the fan liner. The block and brackets can also help position the fan liner relative the inlet cowl and the fan case and constrain rotational movement of the fan liner relative the inlet cowl and the fan case. A first gap can exist between a forward end of the fan liner and the inlet cowl, and a second gap can exist between the fan case and a radially outer surface of the fan liner. The first and second gaps can permit the fan liner to thermally contract and expand at a different coefficient of thermal expansion than the inlet cowl and the fan case. The fan liner can be primarily made from the same material as the fan blades, or can be made from a different material with a coefficient of thermal expansion substantially similar to that of the material of the fan blades. Because the fan liner and fan blades can share substantially similar coefficients of thermal expansion, the fan liner can contract and expand substantially in unison with the fan blades, reducing or preventing clearance gaps from forming between the fan liner and the fan blades. Because the fan liner is not rigidly affixed to the fan case, the fan liner is not subject to size variations or stresses due to thermal expansion of the fan case, and the fan case can therefore be made from a different material than that of the fan liner.

FIG. 1 is a cross-sectional view of gas turbine engine 10, in a turbofan embodiment. Other configurations are possible in further embodiments, such as low bypass ratio gas turbine engines. As shown in FIG. 1, gas turbine engine 10 includes fan 12, low pressure compressor (LPC) section 14, high pressure compressor (HPC) section 16, combustor 18, high pressure turbine (HPT) section 20, low pressure turbine (LPT) section 22, fan case 24, bypass duct 28, fan inlet cowl 30, exhaust nozzle 32, core flowpath $F_C$, high pressure (HP) shaft 36, low pressure (LP) shaft 38, and structural guide vanes 40. Engine centerline CL denotes a central axis of gas turbine engine 10 in a direction parallel to the axial direction. Fan 12, LPC section 14, HPC section 16, combustor 18, HPT section 20, and LPT section 22 are arranged in flow series between fan inlet cowl 30 and exhaust nozzle 32 along engine centerline CL. As embodied in FIG. 1, fan 12 includes a plurality of fan blades 42 carried by fan hub 43. Basic operation of gas turbine engine 10 is well known and is not described in detail here. Gas turbine engine 10 can further include other components and features not specifically shown or discussed.

Fan case 24 is disposed around fan 12. Fan blades 42 of fan 12 are circumferentially arranged in cascade around fan hub 43, which can be rotationally coupled, directly or indirectly, to LP shaft 38. In some embodiments, such as the embodiment of FIG. 1, fan 12 is coupled to the low pressure spool via a geared fan drive mechanism, providing independent fan speed control. As shown in FIG. 1, fan 12 is forward-mounted and provides thrust by accelerating flow downstream through bypass duct 28. In operation of gas turbine engine 10, airflow F enters a flowpath defined by fan inlet cowl 30 and can divide into a core airflow and a bypass airflow, downstream of fan 12. The core airflow propagates along core flowpath $F_C$ through LPC section 14, HPC section 16, combustor 18, HPT section 20, and LPT section 22. The bypass airflow propagates along bypass flowpath $F_B$ through bypass duct 28. Structural guide vanes 40 can be disposed inside bypass duct 28 and extend between fan case 24 and core case 26. As the bypass airflow flows from fan 12 into bypass duct 28, structural guide vanes 40 help de-swirl the bypass airflow into an axial direction substantially parallel to engine centerline CL. Structural guide vanes 40 also connect core case 26 to fan case 24 and center core case 26 and the engine core inside fan case 24.

Figure 2:
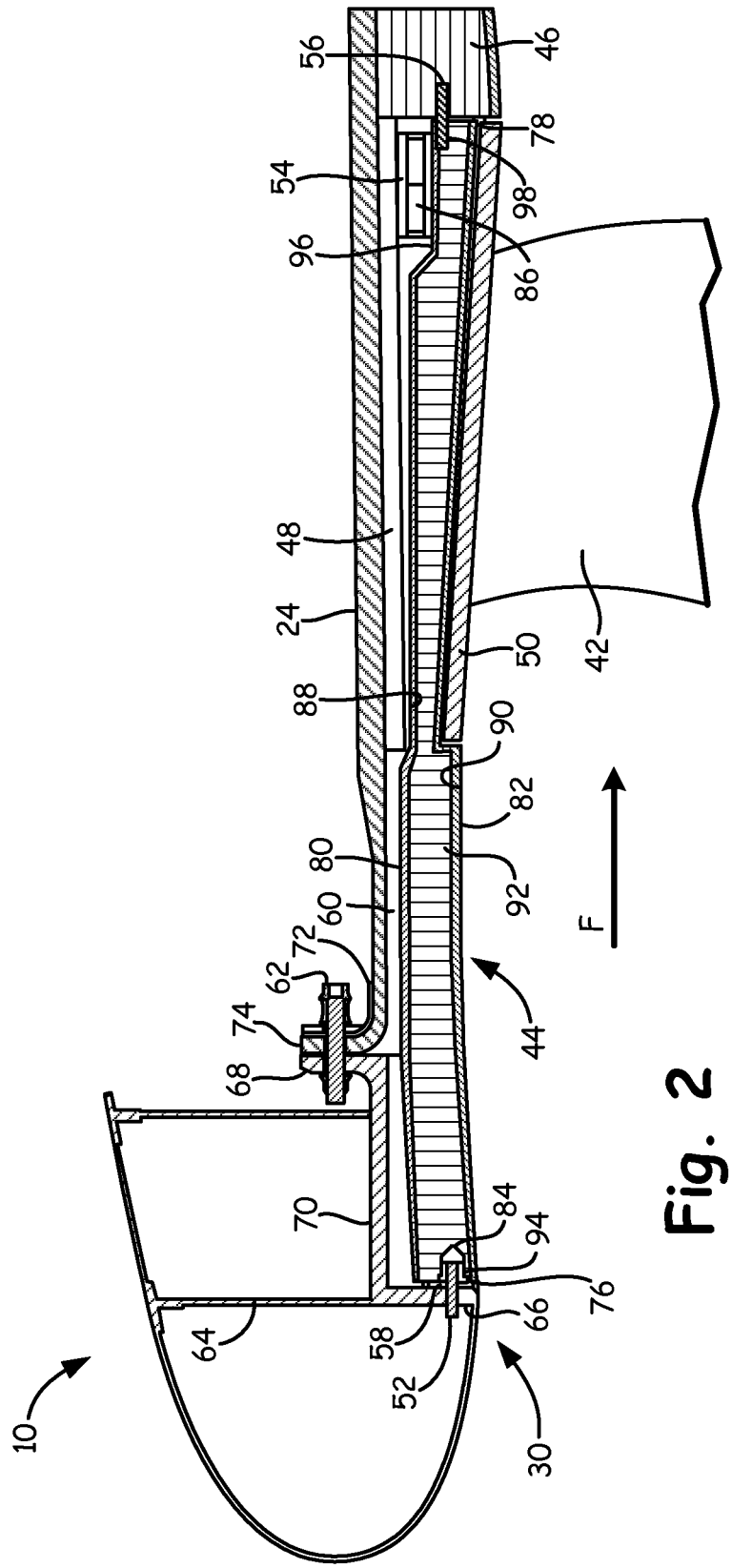
FIG. 2 is a cross-sectional view of a fan inlet cowl, a fan case, and a fan liner of the gas turbine engine from FIG. 1.
Figure 3:
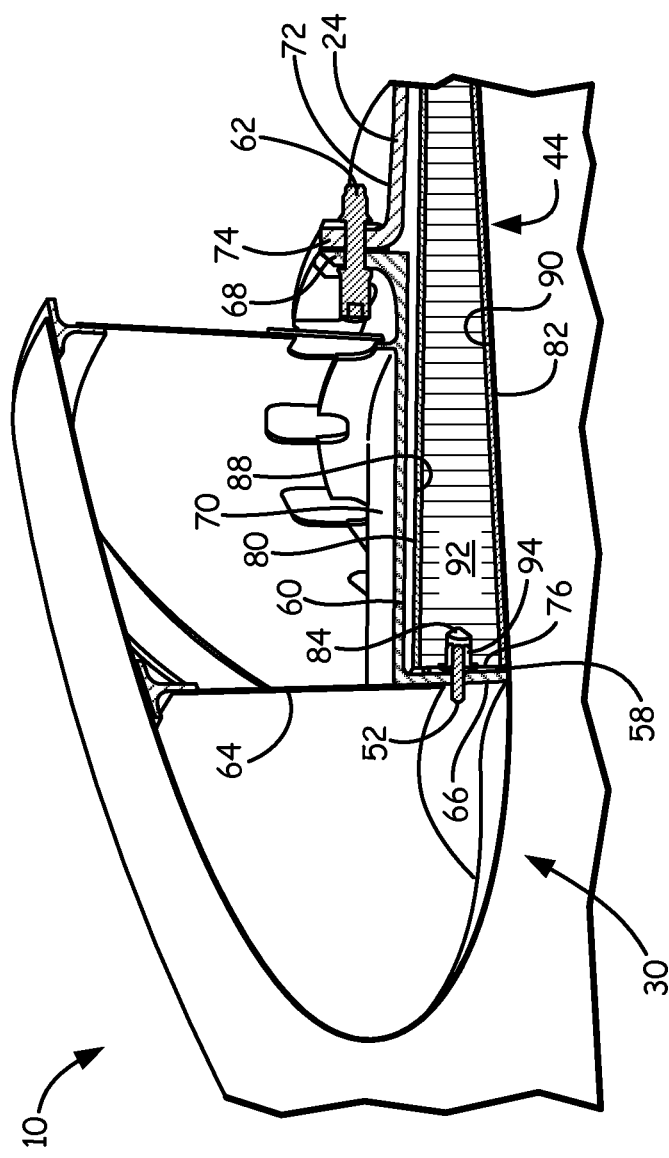
FIG. 3 is a cross-sectional perspective view of the fan inlet cowl and forward ends of the fan case and fan liner from FIG. 2.
Figure 4:
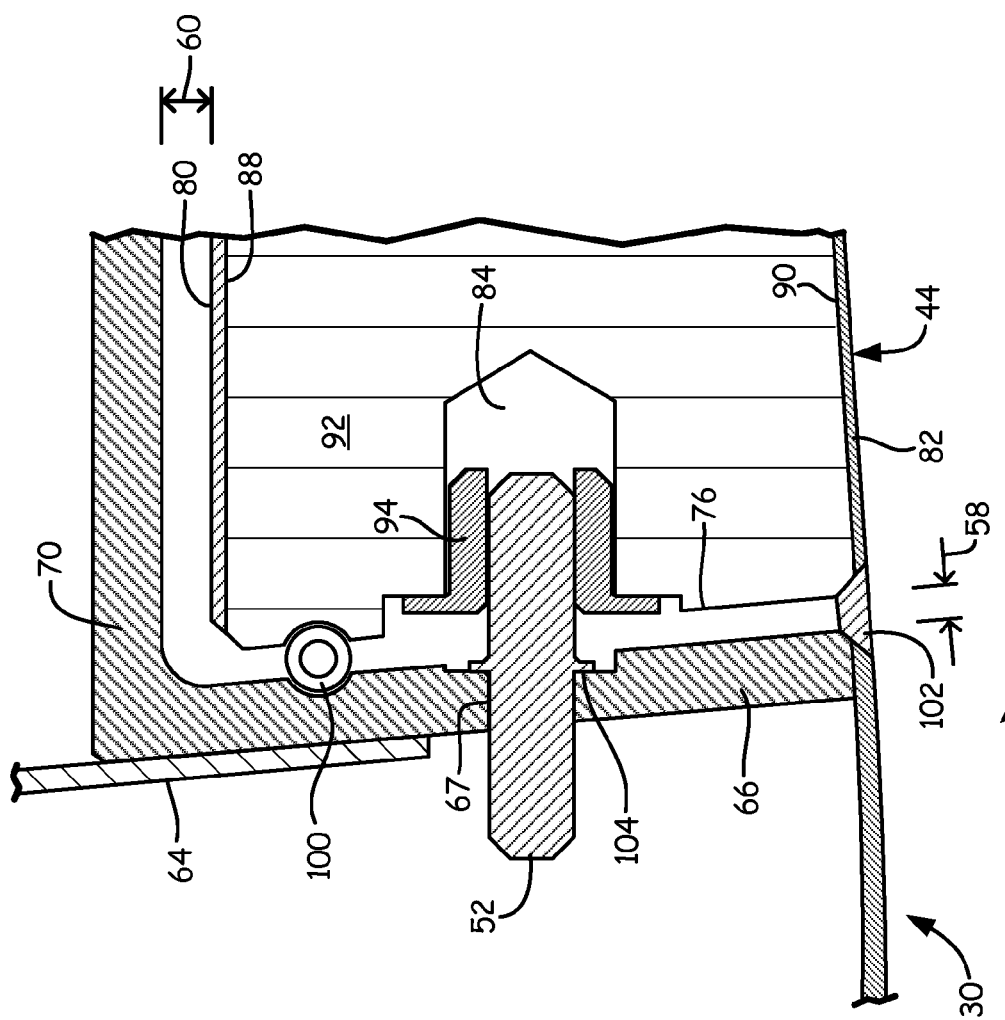
FIG. 4 is an enlarged cross-sectional view of an engagement member connecting the forward end of the fan liner to the fan inlet cowl.

FIGS. 2-4 will now be discussed concurrently. FIG. 2 is a cross-sectional view of a portion of gas turbine engine 10 that includes fan case 24, fan inlet cowl 30, and fan liner 44. FIG. 3 is a cross-sectional perspective view of inlet cowl 30, forward end 72 of fan case 24, and forward end 76 of fan liner 44 from gas turbine engine 10 of FIG. 2. FIG. 4 is an enlarged cross-sectional view of engagement members 52, forward end 76 of fan liner 44, and first flange 66 of fan inlet cowl 30. In addition to the elements previously described in FIG. 1, gas turbine engine 10 can further include, as shown in FIGS. 2-4, the following elements: fan liner 44, downstream liner 46, ballistic liner 48, rub strip 50, engagement members 52, blocks 54, aft guide members 56, first gap 58, second gap 60, and fasteners 62. Fan case 24 can also include fan case forward end 72 and fan case flange 74. Fan inlet cowl 30 can also includes bulkhead 64, first flange 66, flange holes 67, second flange 68, and base sheet 70. As embodied in FIGS. 2-4, fan liner 44 can also include forward end 76, aft end 78, radially outer surface 80, radially inner surface 82, holes 84, brackets 86, radially outer sheet 88, radially inner perforated sheet 90, honeycomb core 92, bushings 94, reduced diameter portion 96, and aft holes 98. Compliant seal 100, and surface seal 102 can be disposed in first gap 58 between fan inlet cowl 30 and fan liner 44. Engagement members 52 can each include engagement flange 104. A detailed discussion on the assembly of fan liner 44 and the other above mentioned elements is now provided below.

Fan case 24 is positioned generally aftward from fan inlet cowl 30, with both fan case 24 and fan inlet cowl 30 circumscribing the flowpath and fan blades 42. Fan liner 44 is positioned around the flowpath and fan blades 42 and at least partially radially inward from fan case 24. Fan liner 44 can be generally cylindrical and extend between forward end 76 and aft end 78. Radially outer surface 80 of fan liner 44 faces fan case 24 while radially inner surface 82 of fan liner 44 faces the flowpath. Downstream liner 46 is disposed aft of fan liner 44 and radially inward from fan case 24.

In the illustrated embodiment, fan inlet cowl 30 has first flange 66 positioned forward from forward end 76 of fan liner 44, and also positioned forward from second flange 68. Base sheet 70 can have a generally cylindrical shape and extends axially between first flange 66 and second flange 68 of fan inlet cowl 30. Base sheet 70 spaces and supports both first flange 66 and second flange 68. First flange 66 can extend radially inward away from base sheet 70 while second flange 68 can extend radially outward away from base sheet 70. First flange 66 can also be incorporated into bulkhead 64 of fan inlet cowl 30, as shown in the embodiment of FIG. 2.

Holes 84 can extend substantially axially into forward end 76 of fan liner 44 between radially outer surface 80 and radially inner surface 82. Holes 84 can have any desired shape, such as a cylindrical shape, a slot-like shape, a crescent shape, or a triangular shape. As shown in FIG. 2, holes 84 spaced from both radially outer surface 80 and radially inner surface 82, and spaced closer to radially inner surface 82 than radially outer surface 80. Engagement members 52 extend aftward from first flange 66 of fan inlet cowl 30 and into holes 84 on forward end 76 of fan liner 44. Engagement members 52 can be rigidly fixed to fan inlet cowl 30 while being non-rigidly fixed inside holes 84 of fan liner 44, or vice versa. Engagement members 52 can be pins, studs, flat metal biscuits, rods, tubes, or the like. In the embodiment illustrated in FIGS. 2-4, engagement members 52 are generally cylindrical pins. During assembly of gas turbine engine 10, each engagement member 52 is inserted into one of holes 84 such that each engagement member 52 is partially disposed in one of the holes 84 and extends axially forward from forward end 76 of fan liner 44. Fan inlet cowl 30 is then positioned on engagement members 52 such that engagement members 52 extend into first flange 66 of fan inlet cowl 30. Flange holes 67 can also be formed in first flange 66 to accommodate engagement members 52. Engagement members 52 can loosely connect fan case 24 to fan inlet cowl 30 and help resist rotation of fan liner 44 relative fan case 24 and fan inlet cowl 30. Engagement flange 104 can be formed on each of engagement members 52 between first flange 66 of fan inlet cowl 30 and forward end 76 of fan liner 44. Engagement flange 104 reduces the likelihood of engagement members 52 being completely pushed into holes 84 or the likelihood that engagement members 52 will be completely pushed forward out of holes 84 and across first flange 66. Engagement flange 104 can also set the depth that engagement members 52 extend into holes 84. Each bushing 94 is disposed in one of holes 84 and around one of engagement members 52. As shown in the embodiment of FIG. 3, there are eight holes 84 evenly spaced circumferentially on forward end 76 of fan liner 44, and one bushing 94 nested in each of holes 84. Additional structural support can be disposed around holes 84 and bushings 94 in addition to honeycomb core 92. This additional structural support can include local aluminum blocks co-molded with honeycomb core 92 or potting adhesive disposed between cells of honeycomb core 92 proximate holes 84.

Fan case flange 74 is disposed on fan case forward end 72 and is disposed immediately aft second flange 68 of fan inlet cowl 30. Fasteners 62 connect second flange 68 of fan inlet cowl 30 to fan case flange 74 of fan case 24. Second flange 68 and fan case flange 74 can be spaced forward from aft end 78 of fan liner 44 and aftward from first flange 66 and forward end 76 of fan liner 44, such that a portion of fan liner 44 extends axially forward from forward end 72 of fan case 24. By extending axially forward beyond forward end 72 of fan case 24, fan liner 44 also lines and provides acoustic treatment to the flowpath upstream from fan blades 42, eliminating the need for an additional and separate liner upstream form fan blades 42.

Fan case 24 can be constructed of a composite material that is lighter and stronger than conventional metals used in fan cases, such as aluminum. Fan liner 44 can be made from the same metal as fan blades 42, or from a different material with a coefficient of thermal expansion substantially similar to that of the material of fan blades 42.

In the embodiment of FIGS. 2 and 3, fan liner 44 is made of aluminum. Radially outer sheet 88, radially inner perforated sheet 90, and honeycomb core 92 form the bulk of fan liner 44. Honeycomb core 92 is disposed between radially outer sheet 88 and radially inner perforated sheet 90. Honeycomb core 92 and radially inner perforated sheet 90 of fan liner 44 form an array of Helmholtz resonators that can help dissipate energy of acoustic shock waves generated by gas turbine engine 10, thereby reducing noise during operation. Resonators of fan liner 44 can have single, double, or more degrees of freedom. Holes 84 can extend axially into honeycomb core 92 at forward end 76 of fan liner 44. Bushings 94 help provide support between honeycomb core 92 and engagement members 52, and help to evenly distribute the loads transferred from engagement members 52 to honeycomb core 92. Radially outer sheet 88, radially inner perforated sheet 90, honeycomb core 92, and bushings 94 can all be made of the same metal. In the embodiment of FIGS. 2 and 3, radially outer sheet 88, radially inner perforated sheet 90, honeycomb core 92, and bushings 94 are all made of aluminum. In some embodiments, fan liner 44 may have a thickness, defined between radially outer surface 80 and radially inner surface 82, that varies axially and circumferentially. The thickness of fan liner 44 can be varied axially and/or circumferentially to customize the acoustic attenuating properties of fan liner 44 to specific sound frequencies that are more prevalent at specific locations along the flowpath. The thickness of fan liner 44 can also be varied axially and/or circumferentially to create a specific three-dimensional, non-axisymmetric endwall flowpath across fan inlet cowl 30 and fan blades 42 that helps improve airflow F in gas turbine engine 10, particularly at boundary layers. Because engagement members 52 help resist rotation of fan liner 44 relative fan case 24 and fan inlet cowl 30 as discussed above, engagement members 52 assist in maintaining the varied thickness of fan liner 44 in an intended circumferential position. Brackets 86 and blocks 54, discussed further below, also assist in maintaining the varied thickness of fan liner 44 in its intended circumferential position.

Rub strip 50 is an abradable strip disposed on radially inner surface 82 of fan liner 44 between fan blades 42 and fan liner 44. Rup strip 50 helps reduce or close any clearance gaps between fan liner 44 and fan blades 42, thereby improving the efficiency of gas turbine engine 10 by reducing air leakage between the tips of fan blades 42 and fan liner 44. As previously discussed above, fan liner 44 and fan blades 42 have substantially similar coefficients of thermal expansion. Because fan liner 44 and fan blades 42 share substantially similar coefficients of thermal expansion, fan liner 44 thermally contracts and expands at the same rate and amount as fan blades 42, reducing the likelihood of clearance gaps developing between fan blades 42 and rub strip 50.

First gap 58 and second gap 60 provide sufficient space between fan liner 44, fan inlet cowl 30, and fan case 24 to accommodate for the thermal expansion of fan liner 44. First gap 58 exists in a generally axial direction between first flange 66 and forward end 76 of fan liner 44. During operation, as fan liner 44 changes temperature and expands and contracts, fan liner 44 is able to move axially on a small scale on engagement members 52, thereby enlarging or reducing first gap 58. First gap 58 and second gap 60 also help reduce or eliminate the assembly tolerances between fan liner 44 and fan case 24, and inlet cowl 30, thereby reducing the manufacturing complexity and cost of gas turbine engine 10.

Compliant seal 100 and surface seal 102 can be disposed in first gap 58 between first flange 66 of fan inlet cowl 30 and forward end 76 of fan liner 44. Compliant seal 100 can be an axial pitch seal that reduces airflow F from bleeding into first gap 58 and second gap 60 and out of the flowpath. Compliant seal 100 also reduces axial movement of fan liner 44 relative fan case 24. In further embodiments, compliant seal 100 can be a w-seal or any other type of suitable seal. Surface seal 102 also reduces airflow F from bleeding into first gap 58 and second gap 60 and out of the flowpath. Surface seal 102 also helps create a smooth transition in the flowpath between fan inlet cowl 30 and fan liner 44, thereby reducing a risk of forward end 76 of fan liner 44 creating turbulence in the flowpath and airflow F. Surface seal 102 can be a room temperature vulcanizing (RTV) silicone that is applied after fan case 24, fan inlet cowl 30, and finer 44 are assembled. A smooth transition in the flowpath between fan inlet cowl 30 and fan liner 44 can also be created by filleting a leading edge on forward end 76 of fan liner 44.

Second gap 60 exists in a generally radial direction between radially outer surface 80 of fan liner 44 and fan case 24. A small amount of clearance can also exist between blocks 54 and radially outer surface 80 of fan liner 44 so that fan liner 44 may expand radially during operation. An additional gap can also exist between fan liner 44 and downstream liner 46 that functions similar to first gap 58. Because of engagement members 52, first gap 58, and second gap 60, fan case 24 and fan inlet cowl 30 can be made from different materials with different coefficients of thermal expansion since fan liner 44 is able to thermally contract or expand independent of fan inlet cowl 30 and fan case 24. Because fan case 24 and fan inlet cowl 30 can be made from different materials than fan liner 44, a wider range of materials may be used in constructing gas turbine engine 10 so that gas turbine engine 10 is stronger and lighter without compromising the efficiency of fan blades 42.

Brackets 86 can be connected onto outer surface 80 of fan liner 44 proximate aft end 78 of fan liner 44. Blocks 54 extend radially inward from fan case 24 and contact brackets 86. Brackets 86 and blocks 54 only contact each other, but need not be fixedly connected together so as to allow relative movement of fan liner 44. Along with engagement members 52, brackets 86 and blocks 54 help resist rotation of fan liner 44 relative fan case 24 and fan inlet cowl 30, thereby helping to maintain fan liner 44 in its intended circumferential (i.e., clocking) position. Outer surface 80 of fan liner 44 can optionally include reduced diameter portion 96 proximate aft end 78 of fan liner 44, with brackets 86 being disposed on reduced diameter portion 96. Reduced diameter portion 96 provides additional space between fan liner 44 and fan case 24 to accommodate brackets 86 and blocks 54.

Aft guide members 56 can be disposed on downstream liner 46 and can extend substantially axially forward into aft end 78 of fan liner 44. Aft guide members 56 can help guide the installation of fan liner 44 with respect to fan case 24 and increase the likelihood that fan liner 44 is properly aligned with fan case 24, such that brackets 86 and blocks 54 correctly engage one another. If fan liner 44 is improperly aligned with fan case 24 during installation, aft guide members 56 will abut aft end 78 of fan liner 44 and create an enlarged space between fan liner 44 and downstream liner 46. Visual inspection of the enlarged space between fan liner 44 and downstream liner 46 would indicate to an assembly operator that fan liner 44 is misaligned circumferentially with respect to fan case 44.

Ballistic liner 48 can be disposed in second gap 60, and can be bonded or otherwise secured between fan case 24 and blocks 54. Ballistic liner 48 can be made of Kevlar® and reinforces fan case 24 during "fan-blade-out" incidents. Blocks 54 and brackets 86 are discussed in further detail below with regards to FIGS. 5 and 6.

Figure 5:
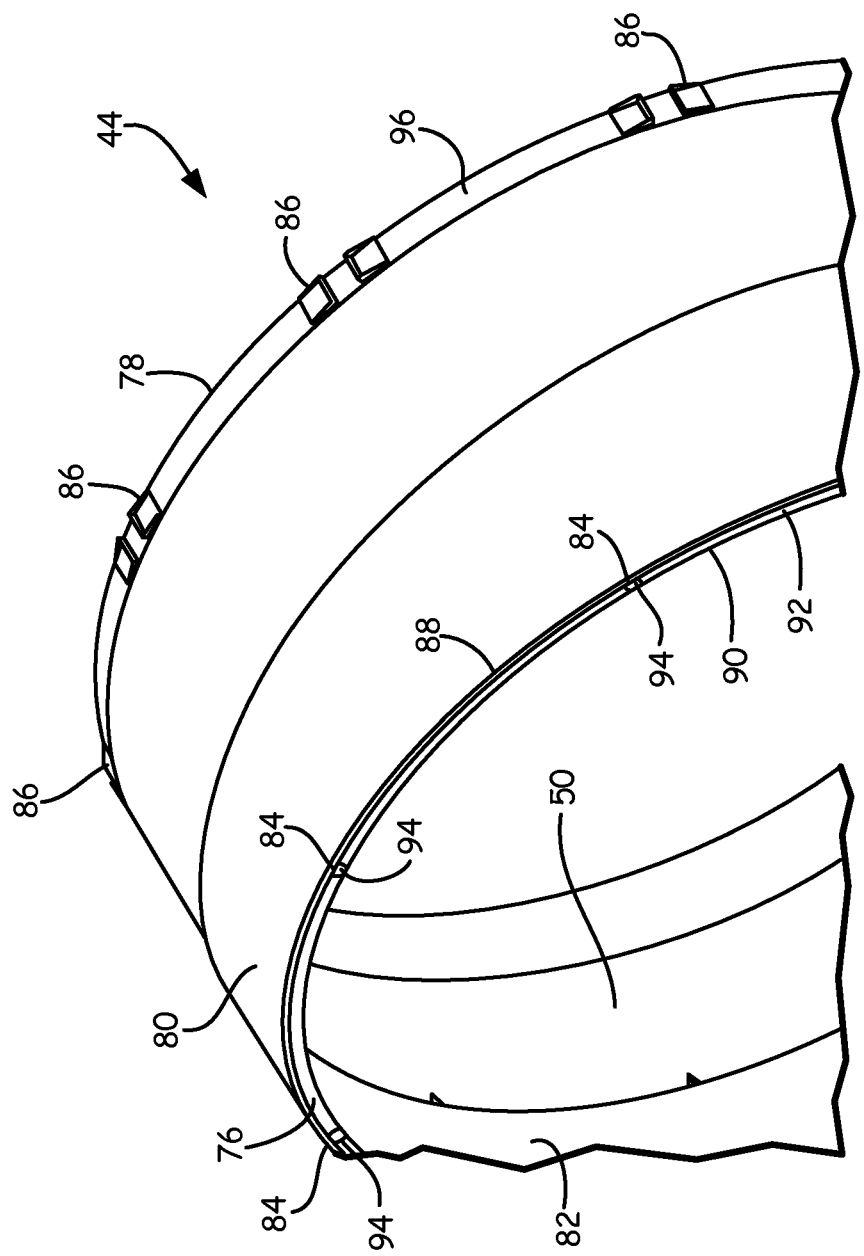
FIG. 5 is a perspective view of the fan liner from FIG. 2.
Figure 6:
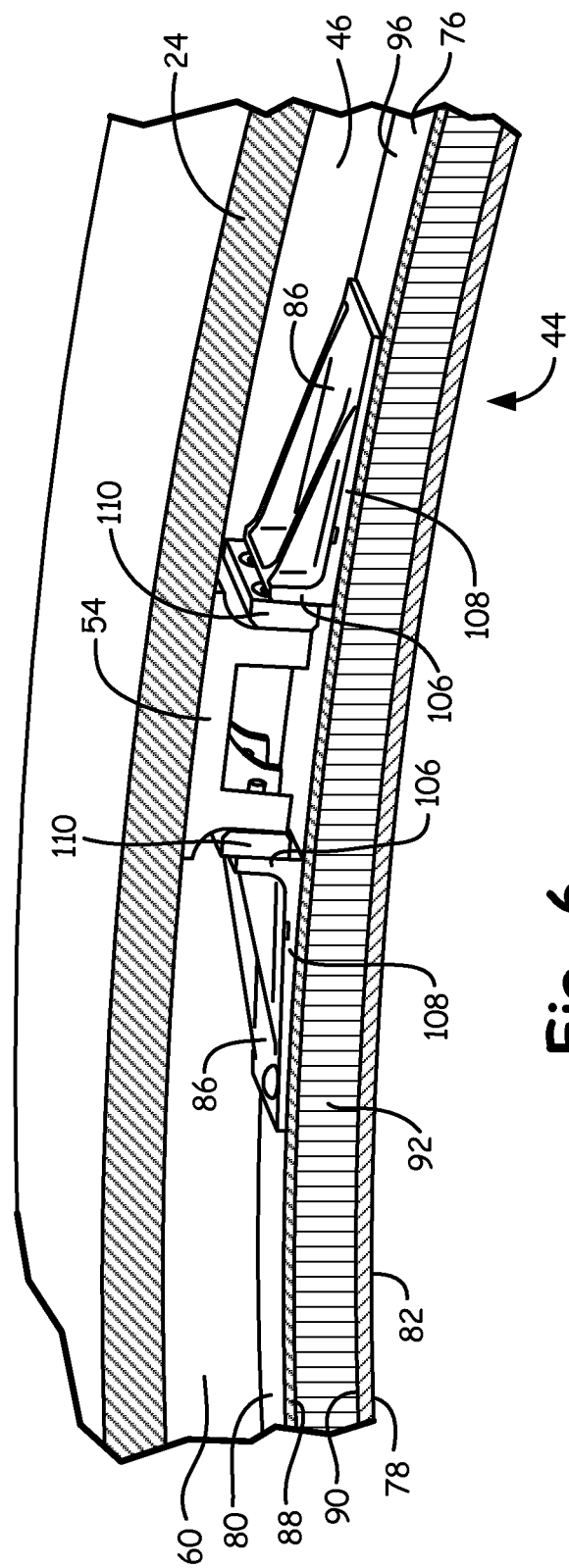
FIG. 6 is a cross-sectional perspective view of the fan case and the fan liner from FIG. 2, and a bracket and block assembly therebetween.

FIGS. 5 and 6 will now be discussed concurrently. FIG. 5 is a perspective view of fan liner 44 shown in isolation. FIG. 6 is an enlarged perspective and cross-sectional view of fan case 24, fan liner 44, brackets 86, and blocks 54. As shown in FIGS. 5 and 6, blocks 54 can include rub pads 110, and each bracket 86 can include radial surface 106 and circumferential surface 108. Brackets 86 can each be substantially L-shaped, with circumferential surface 108 of brackets 86 extending in a direction parallel to radially outer surface 80 of fan liner 44, and with radial surface 106 of brackets 86 extending substantially oblique from circumferential surface 108 in a substantially radial direction. Circumferential surface 108 of each bracket 86 can be bonded and/or riveted to radially outer surface 80 of fan liner 44. Brackets 86 are arranged as pairs on radially outer surface 80 of fan liner 44 with radial surfaces 106 of both brackets 86 in the pair facing each other. Blocks 54 extend radially inward from fan case 24, each block 54 extending between radial surfaces 106 of a pair of brackets 86. Two rub pads 110 are disposed on each block 54 with one rub pad 110 disposed between block 54 and radial surface 106 of one bracket 86 of the pair of brackets 86, and a second of the rub pads 110 disposed between block 54 and radial surface 106 of the other bracket 86 of the pair of brackets 86. Rub pads 110, as embodied in FIG. 6, can be made of polytetrafluoroethylene (PTFE), or another low-friction material. Brackets 86 and blocks 54 can be made of a metal, like aluminum, or any other suitable material, such as injection molded plastic.

In view of the foregoing description, it will be recognized that the present disclosure provides numerous advantages and benefits. For example, the present disclosure provides fan liner 44 positioned aft from fan inlet cowl 30 and radially inward from fan case 24. Fan liner 44 can be rotationally positioned relative to fan inlet cowl 30 and fan case 24 by engagement members 52, brackets 86, and blocks 54. Aside from engagement members 52, brackets 86, and blocks 54, fan liner can be essentially thermally decoupled from fan inlet cowl 30 and fan case 24. First gap 58 and second gap 60 can provide sufficient space between fan liner 44, fan inlet cowl 30, and fan case 24 to accommodate for the independent thermal expansion of fan liner 44 relative to fan inlet cowl 30 and fan casing 24. Fan liner 44 and fan blades 42 can have substantially similar coefficients of thermal expansion. Because fan liner 44 and fan blades 42 can share substantially similar coefficients of thermal expansion, fan liner 44 thermally can contract and expand at substantially the same rate and amount as fan blades 42, reducing the likelihood of clearance gaps developing between fan blades 42 and rub strip 50. Because of engagement members 52, first gap 58, and second gap 60, fan case 24 and fan inlet cowl 30 can be made from different materials with different coefficients of thermal expansion than fan liner 44 because fan liner 44 is able to thermally contract or expand independent of fan inlet cowl 30 and fan case 24. Because fan case 24 and fan inlet cowl 30 can be made from different materials than fan liner 44, a wider range of materials may be used in constructing fan inlet cowl 30 and fan case 24. Persons of ordinary skill in the art will recognize further advantages and benefits in view of the entire disclosure.

DISCUSSION OF POSSIBLE EMBODIMENTS

The following are non-exclusive descriptions of possible embodiments of the present invention.

In one embodiment, a gas turbine engine includes an assembly with a liner disposed around a flowpath. The liner has a forward end, a radially outer surface, and a radially inner surface. A hole extends axially into the forward end of the liner between the radially outer surface and the radially inner surface, and an engagement member is at least partially disposed in the hole and extends axially forward from the forward end of the liner.

The gas turbine engine of the preceding paragraph can optionally include, additionally and/or alternatively, any one or more of the following features, configurations and/or additional components:

wherein a bracket is disposed on the outer surface of the liner proximate an aft end of the liner;

wherein the outer surface of the liner comprises a reduced diameter portion proximate the aft end of the liner, and the bracket is disposed on the reduced diameter portion of the outer surface of the liner;

wherein a radially outer sheet forms the radially outer surface of the liner, a radially inner perforated sheet forms the radially inner surface of the liner, and a honeycomb core is disposed between the radially outer sheet and the radially inner perforated sheet;

wherein the hole extends axially into the honeycomb core at the forward end of the liner;

wherein a bushing is disposed in the hole and around the engagement member;

wherein the radially outer sheet, the radially inner perforated liner, the honeycomb core, and the bushing are all made of the same metal; and/or wherein the radially outer sheet, the radially inner perforated liner, the honeycomb core, and the bushing are all made of aluminum.

In another embodiment, a method of assembling a fan liner in a gas turbine engine includes positioning the fan liner at least partially radially inward from a fan case and around a flowpath. The fan liner includes a forward end, a radially outer surface, a radially inner surface, and a hole disposed in the forward end between the radially outer surface and the radially inner surface. An engagement member is inserted into the hole such that a portion of the engagement member extends forward from the hole. A fan inlet cowl is positioned on the engagement member and forward from the fan liner such that the engagement member extends into a first flange of the fan inlet cowl. The first flange is disposed forward from the forward end of the fan liner.

The method of the preceding paragraph can optionally include, additionally and/or alternatively, any one or more of the following features, configurations and/or additional components:

wherein a second flange of the fan inlet cowl is connected to a forward end of the fan case, the second flange being disposed aftward from the first flange and the forward end of the fan liner, and forward from the fan case and an aft end of the fan liner, and at least partially radially outward from the first flange.

In yet another embodiment, a gas turbine engine includes a fan inlet cowl and a fan case disposed aftward from the fan inlet cowl. A fan liner is disposed at least partially radially inward from the fan case. The fan liner includes a forward end disposed aftward from the fan inlet cowl, a radially outer surface facing the fan case, and a radially inner surface facing a gas flowpath bounded by the fan case and fan inlet cowl. At least one engagement member extends aftward from the fan inlet cowl and into the forward end of the fan liner.

The gas turbine engine of the preceding paragraph can optionally include, additionally and/or alternatively, any one or more of the following features, configurations and/or additional components:

wherein a first bracket and a second bracket are disposed on the outer surface of the fan liner, and a block extends radially inward from the fan case and between the first bracket and the second bracket, the block contacting the first bracket and the second bracket;

wherein the first bracket and the second bracket are each substantially L-shaped;

wherein a first flange is disposed forward from the forward end of the fan liner and a second flange is disposed aftward from the first flange and the forward end of the fan liner, and forward from the fan case and an aft end of the fan liner, the second flange being disposed at least partially radially outward from the first flange;

wherein the at least one engagement member extends aftward from the first flange into the forward end of the fan liner;

wherein the second flange is connected to a forward end of the fan case;

wherein a gap is disposed between the first flange and the forward end of the fan liner and a compliant seal is disposed in the gap between the first flange and the forward end of the fan liner;

wherein a second gap is disposed between the radially outer surface of the fan liner and the case;

wherein the fan case comprises a composite material and the fan liner comprises aluminum; and/or wherein the at least one engagement member is selected from the group comprising pins, studs, flat metal biscuits, and rods.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal or rotational operational conditions, and the like.

While the invention has been described with reference to an exemplary embodiment(s), it will be understood by those skilled in the art that various changes may be made and equivalents may be substituted for elements thereof without departing from the scope of the invention. For example, while the specification describes eight holes 84, eight engagement members 52, and eight bushings 94 being disposed on forward end 76 of fan liner 44, any number of holes 84, engagement members 52, and bushings 94 can be used. Similarity, any number of brackets 86 and blocks 54 can be used in the present disclosure. Additionally, while the specification describes holes 84 as being evenly spaced circumferentially on forward end 76 of fan liner 44, holes 84 can be unevenly spaced circumferentially on forward end 76 of fan liner 44 depending on the geometry and rotational loading of fan liner 44. Furthermore, while the specification describes fan liner 44 as being made of aluminum, fan liner 44 may be made from titanium or any other material that has a coefficient of thermal expansion similar to that of the material used in fan blades 42. In addition, many modifications may be made to adapt a particular situation or material to the teachings of the invention without departing from the essential scope thereof. For example, while the invention has been described as being applied in the fan section of a gas turbine engine in an aircraft, the invention may be used in other areas of a gas turbine engine used in aircraft or electricity generation, such as a compressor or turbine section. Therefore, it is intended that the invention not be limited to the particular embodiment(s) disclosed, but that the invention will include all embodiments falling within the scope of the appended claims.

The invention claimed is:

1. An assembly for a gas turbine engine, the assembly comprising:
   a liner disposed around a flowpath, the liner having a forward end, a radially outer surface, and a radially inner surface, wherein the liner further comprises:
      a radially outer sheet that forms the radially outer surface of the liner;
      a radially inner perforated sheet that forms the radially inner surface of the liner; and a honeycomb core disposed between the radially outer sheet and the radially inner perforated sheet;
a hole extending axially into the forward end of the liner between the radially outer surface and the radially inner surface, wherein the hole extends axially into the honeycomb core at the forward end of the liner; and
an engagement member at least partially disposed in the hole and extending axially forward from the forward end of the liner.

2. The assembly of claim 1 further comprising:
a bracket disposed on the outer surface of the liner proximate an aft end of the liner.

3. The assembly of claim 2, wherein the outer surface of the liner comprises a reduced diameter portion proximate the aft end of the liner and the bracket is disposed on the reduced diameter portion of the outer surface of the liner.

4. The assembly of claim 1, wherein a bushing is disposed in the hole and around the engagement member.

5. The assembly of claim 4, wherein the radially outer sheet, the radially inner perforated sheet, the honeycomb core, and the bushing are all made of the same metal.

6. The assembly of claim 4, wherein the radially outer sheet, the radially inner perforated sheet, the honeycomb core, and the bushing are all made of aluminum.

7. A method of assembling a fan liner in a gas turbine engine, the method comprising:
positioning the fan liner at least partially radially inward from a fan case and around a flowpath, the fan liner having a forward end, a radially outer surface, a radially inner surface, a honeycomb core disposed between the radially outer surface and the radially inner surface, and a hole disposed in the forward end between the radially outer surface and the radially inner surface, wherein the hole extends axially into the honeycomb core at the forward end of the fan liner;
inserting an engagement member into the hole such that a portion of the engagement member extends forward from the hole; and
positioning a fan inlet cowl on the engagement member and forward from the fan liner such that the engagement member extends into a first flange of the fan inlet cowl, wherein the first flange is disposed forward from the forward end of the fan liner.

8. The method of claim 7, the method further comprising:
connecting a second flange of the fan inlet cowl to a forward end of the fan case, wherein the second flange is disposed aftward from the first flange and the forward end of the fan liner, and forward from the fan case and an aft end of the fan liner, and at least partially radially outward from the first flange.

9. A gas turbine engine comprising:
a fan inlet cowl;
a fan case disposed aftward from the fan inlet cowl;
a fan liner disposed at least partially radially inward from the fan case, the fan liner having a forward end disposed aftward from the fan inlet cowl, a radially outer surface facing the fan case, and a radially inner surface facing a gas flowpath bounded by the fan case and fan inlet cowl, wherein the fan liner further comprises a radially outer sheet that forms the radially outer surface of the fan liner, a radially inner perforated sheet that forms the radially inner surface of the fan liner, and a honeycomb core disposed between the radially outer sheet and the radially inner perforated sheet; and
at least one engagement member extending axially aftward from the fan inlet cowl into the forward end and the honeycomb core of the fan liner.

10. The gas turbine engine of claim 9 further comprising:
a first bracket and a second bracket disposed on the outer surface of the fan liner; and
a block extending radially inward from the fan case and between the first bracket and the second bracket, the block contacting the first bracket and the second bracket.

11. The gas turbine engine of claim 10, wherein the first bracket and the second bracket are each substantially L-shaped.

12. The gas turbine engine of claim 9, wherein the fan inlet cowl further comprises:
a first flange disposed forward from the forward end of the fan liner; and
a second flange disposed aftward from the first flange and the forward end of the fan liner, and forward from the fan case and an aft end of the fan liner, wherein the second flange is disposed at least partially radially outward from the first flange.

13. The gas turbine engine of claim 12, wherein the at least one engagement member extends aftward from the first flange into the forward end of the fan liner.

14. The gas turbine engine of claim 12, wherein the second flange is connected to a forward end of the fan case.

15. The gas turbine engine of claim 12, wherein a gap is disposed between the first flange and the forward end of the fan liner and a compliant seal is disposed in the gap between the first flange and the forward end of the fan liner.

16. The gas turbine engine of claim 15, wherein a second gap is disposed between the radially outer surface of the fan liner and the case.

17. The gas turbine engine of claim 9, wherein the fan case comprises a composite material and the fan liner comprises aluminum.

18. The gas turbine engine of claim 9, wherein the at least one engagement member is selected from the group comprising pins, studs, flat metal biscuits, and rods.

* * * * *